UNITED STATES PATENT OFFICE.

GUSTAV VON PLANITZ, OF SAN FRANCISCO, CALIFORNIA, ASSIGNOR TO THE NITRESINE MANUFACTURING COMPANY, OF SAME PLACE.

EXPLOSIVE COMPOUND

SPECIFICATION forming part of Letters Patent No. 251,145, dated December 20, 1881.

Application filed January 19, 1881. (No specimens.)

*To all whom it may concern:*

Be it known that I, GUSTAV VON PLANITZ, of the city and county of San Francisco, State of California, have invented a new composition of matter to be used as a base for explosive compounds; and I hereby declare the following to be a full, clear, and exact description thereof.

My invention relates to a novel compound as a base for blasting and other powders, and to a process for preparing the same.

It consists in combining nitric acid with resin under circumstances as hereinafter described and claimed, which causes a decomposition and the formation of an entirely new acid compound, which I am not aware has ever before been discovered.

To produce my compound I take ordinary commercial nitric acid and mix it with pure water, raising it to the boiling temperature, after which I add finely-pulverized resin, which is spread over the surface, and when it has melted decomposition ensues, red fumes of nitrous acid being evolved, and a soft yellow substance is formed which rises upon the surface. This is removed as soon as it appears, and is placed in a suitable vessel to cool. The operation is continued by the addition of nitric acid and resin. The proportions of the materials used that I have found to produce good results are fifty parts nitric acid and twenty parts pure water. These are mixed, and when heated to the boiling-point the finely-pulverized resin is spread upon the surface until it is covered. After the substance formed by the decomposition has been placed in the cooler it forms large hollow yellow blisters, which are allowed to remain about thirty-six hours, when they are broken open, and will be found to contain thin orange red crystals, which may be separated from the undecomposed resin by the use of a fine hair-cloth strainer. These crystals constitute the material from which I form the novel base for the explosives, and appear in the form of a yellow powder, insoluble in water, but soluble in alcohol. It has a sharp acid taste, and gives acid reactions. It burns with a slow deflagration, but without explosion. The filter shows nearly pure nitrate of potash, parts of undecomposed resin, and various oils derived from it.

I am aware that nitric acid has heretofore been used to treat resin to form picric acid and isophthalic acid, and hence I do not make any broad claim to the treatment of resin with nitric acid.

Having thus described my invention, what I claim as new, and desire to secure by Letters Patent, is—

1. As a new article of manufacture, a base for blasting-powders and other explosives formed by the combination of nitric acid and resin, mixed and treated substantially as herein described.

2. The method herein described for making a compound to be used as a base for explosive compounds, consisting essentially in mixing nitric acid and water in about the proportions named, raising the mixture to the boiling-point in a suitable vessel, spreading over the surface of the liquid pulverized resin, skimming off the surface the resultant soft foamy product, and drying it, all substantially as set forth.

In witness whereof I have hereunto set my hand.

GUSTAV VON PLANITZ.

Witnesses:
 FRANK A. BROOKS,
 S. H. NOURSE.